Patented May 16, 1933

1,908,746

UNITED STATES PATENT OFFICE

HENRY GAULT AND BERNARD MARIUS ROBERT ANGLA, OF LYON, FRANCE, ASSIGNORS TO SOCIETE DES USINES CHIMIQUES RHONE-POULENC, OF PARIS, FRANCE

PROCESS FOR THE PREPARATION OF CELLULOSE ESTERS

No Drawing. Application filed November 30, 1929, Serial No. 410,874, and in Great Britain December 22, 1928.

The present invention has for its object a process of manufacture of crotonic esters of cellulose, which consists in treating cellulose, or its near transformation products with croton anhydride in presence of esterification catalysts, and if desired, of diluents. It also concerns the new cellulose esters so obtained.

In carrying out the process, it is possible to use as cellulosic raw materials, either untransformed cellulose, for example, cotton or wood pulp which may have been subjected, to purifying treatment or transformed celluloses, hydrocelluloses, oxycelluloses, or hydracellulose, for example, as catalysts, one can use the products employed in the manufacture of cellulose acetate, or of other cellulosic esters, the most suitable proportions and temperatures being selected, according to the catalyst used, for obtaining cellulose crotonates having given properties. As example, may be mentioned sulphuric acid and strong mineral acids, sulphonic acids of the aliphatic or aromatic series, acid salts such as bisulphates, zinc chloride, perchlorates.

The esterification can be performed simply by causing the croton anhydride to react upon the cellulosic material in presence of the catalyst, but it is also possible to operate in presence of diluents; the use of diluents capable of dissolving the crotonic cellulose ester and the crotonic acid formed during the reaction is particularly advantageous, for it allows of obtaining a homogeneous reactional mass; as examples of such diluents, benzene, toluene, melted crotonic acid may be mentioned.

According to the present invention, the cellulose, or its near transformation products, may be directly subjected to esterification. It is however preferable to subject the cellulose fibres to a preliminary treatment intended to facilitate their penetration by the reagents and to induce the formation of products of higher quality by promoting a more uniform reaction. The collulosic fibres may, for example, be treated by means of melted crotonic acid, to which may be added the whole or a portion of the catalyst employed; more simply, it is sufficient to place them for several hours, preferably with the application of heat, in an atmosphere of crotonic acid.

The crotonic esters of cellulose obtained in accordance with the present invention are soluble in a great number of organic solvents; their solutions give, by evaporation, transparent films. They may be used in the manufacture of plastic materials, artificial threads, films, masses similar to celluloid or varnishes, for example; as they contain in their molecule the double bond of the crotonyl group, they can also be used in the preparation of new industrial products by fixation of various radicals or elements on this double bond.

When crotonic anhydride is caused to react upon cotton in the presence of acetic acid and a catalyst, we have found that one obtains cellulose esters containing acetyl and crotonyl groups; this reaction constitutes the object of our co-pending application Serial No. 411,672.

In order to illustrate the invention, examples will be given hereafter, which are in no ways limitative of the manner in which the process can be carried out.

*Example 1.*—100 parts of cellulose are mixed with 25 parts of crotonic acid and the mixture is heated to 90° C. for 16 hours; after allowing to cool down to room temperature, 800 parts of croton anhydride are added and an homogeneous mixture is obtained by stirring for 2 hours. Without discontinuing the stirring, 200 parts of croton anhydride containing 50 parts of methane sulphonic acid are added. The temperature which has a tendency to rise, is then brought to 60° C.; this temperature is maintained until the cellulose is entirely dissolved, which requires generally 3 hours. The reacting solution is precipitated by means of alcohol, water, or any other suitable agent. The obtained precipitate, washed, and dried, constitutes the crotonic ester of cellulose. It is in the form of an amorphous white powder soluble in acetic acid, chloroform, acetone, benzene, toluene, benzylic alcohol, dichlorhydrin, tetrachlorethane; it is insoluble in water, ether, ligroin, carbon tetrachloride, and yields clear and flexible films by evaporation of its solutions.

*Example 2.*—100 parts of cellulose preliminarily treated with 25 parts of crotonic acid as mentioned in Example 1 are placed into an esterifying bath constituted by 500 parts of croton anhydride, 500 parts of benzene and 140 parts of methane sulphonic acid. After stirring for 3 to 4 hours at the ordinary temperature, a clear homogeneous and viscous solution is obtained. The crotonic ester of cellulose may be extracted from this solution by precipitation with alcohol. It is obtained in this manner in the form of an amorphous white powder, having the same solubilities as those of the product of the preceding example.

*Example 3.*—100 parts of cellulose, which have been subjected to a preliminary treatment with crotonic acid as indicated in Example 1, are placed into an esterifying bath composed of 1100 parts of croton anhydride and 50 parts of magnesium perchlorate.

After stirring for 5 to 6 hours at 75° C., a viscous solution is obtained from which the crotonic ester is extracted by precipitation.

*Example 4.*—100 parts of cotton, preliminarily treated with crotonic acid as indicated in Example 1, are placed into a mixture of 800 parts of croton anhydride, 400 parts of benzene and 200 parts of benzene sulphonic acid. The mixture is stirred for 4 hours at a temperature from 55 to 60° C. and a solution is obtained in this manner from which the crotonic ester is precipitated with alcohol or any other suitable agent.

*Example 5.*—100 parts of cotton, preliminarily treated with crotonic acid, as indicated in Example 1, are stirred with 1100 parts of croton anhydride for at least 2 hours. 50 parts of anhydrous zinc chloride are then added to the mass and the whole is stirred for 24 hours at ordinary temperature; the temperature is then raised to about 75° C. and after about 15 hours stirring at this temperature a viscous and homogeneous solution is obtained. The cellulose crotonate is extracted from this solution by precipitation with water.

*Example 6.*—100 parts of cellulose are added to a mixture constituted by 250 parts of crotonic acid, 250 parts of benzene and 30 parts of methane sulphonic acid. The whole is stirred at ordinary temperature for 16 hours and then placed into an esterifying bath containing 500 parts of croton anhydride and 90 parts of methane sulphonic acid. The mixture is stirred for 4 to 5 hours at ordinary temperature. A viscous and homogeneous mass is obtained in this manner from which the cellulose crotonate is extracted by precipitation with diluted alcohol (85 parts of alcohol by volume with 15 parts of water). The product, washed and dried, has the solubilities which have already been described and its collodions give by evaporation films which are clear, transparent and strong.

*Example 7.*—100 parts of cellulose are stirred with 30 parts of crotonic acid at ordinary temperature, then allowed to stand for 24 hours at 90° C. After cooling, they are subjected to the action of an esterifying bath comprising 600 parts of croton anhydride, 400 parts of benzene and 6 parts of sulphuric acid 66° Bé.

The mixture is stirred for 2½ hours at 30° C., then for ½ hour at 45–50° C. A viscous solution is obtained in this manner, from which the crotonic ester is extracted by precipitation with alcohol or any other suitable agent.

What we claim and desire to secure by Letters Patent is:—

1. A process of manufacture of crotonic esters of cellulose comprising treating cellulose with croton anhydride in presence of esterification catalysts.

2. A process of manufacture of crotonic esters of cellulose comprising treating cellulose with croton anhydride in presence of esterification catalysts in the presence of a diluent which is a solvent of the crotonic esters of cellulose.

3. A process of manufacture of crotonic esters of cellulose as claimed in claim 1 in which the diluent, which is a solvent of the crotonic esters of cellulose, is benzene.

4. A process of manufacture of crotonic esters of cellulose as claimed in claim 1, in which the cellulose fibres are preliminarily placed for several hours in an atmosphere of crotonic acid with the application of heat.

5. A process of manufacture of crotonic esters of cellulose consisting in treating crotonic acid, in a stirred esterifying bath, containing croton anhydride, benzene and methane sulphonic acid, until a clear, homogeneous viscous solution is obtained, and separating the crotonic ester of cellulose by precipitation with alcohol.

In testimony whereof we have signed our names to this specification.

HENRY GAULT.
BERNARD MARIUS ROBERT ANGLA.